(12) United States Patent
Pawletko

(10) Patent No.: US 6,836,035 B1
(45) Date of Patent: Dec. 28, 2004

(54) STEPPER MOTOR FOR VEHICLE PROPULSION BY DIRECT WHEEL DRIVE

(76) Inventor: Joseph P. Pawletko, 3718 Maplehurst Dr., Endwell, NY (US) 13760

(*) Notice: Subject to any disclaimer, the term of this patent is extended or adjusted under 35 U.S.C. 154(b) by 50 days.

(21) Appl. No.: 10/452,005

(22) Filed: Jun. 3, 2003

(51) Int. Cl.$^7$ ............................. H02K 37/06; B60K 7/00
(52) U.S. Cl. ................. 310/49 R; 310/67 A; 310/68 B; 310/254; 180/65.5
(58) Field of Search .......................... 310/49 R, 67 A, 310/67 R, 68 B, 254, 265, 112, 267; 180/65.1, 65.5, 65.8

(56) References Cited

U.S. PATENT DOCUMENTS

| | | | | |
|---|---|---|---|---|
| 3,344,325 A | * | 9/1967 | Sklaroff | 318/696 |
| 4,315,171 A | * | 2/1982 | Schaeffer | 310/49 R |
| 4,355,249 A | * | 10/1982 | Kenwell | 310/49 R |
| 4,424,463 A | * | 1/1984 | Musil | 310/49 R |
| 4,853,567 A | * | 8/1989 | Muramatsu et al. | 310/67 R |
| 5,315,192 A | * | 5/1994 | Satomi | 310/49 R |
| 5,509,492 A | | 4/1996 | Pfannschmidt | |
| 5,894,902 A | * | 4/1999 | Cho | 180/65.5 |
| 6,278,216 B1 | * | 8/2001 | Li | 310/254 |
| 6,380,646 B1 | * | 4/2002 | Bernauer et al. | 310/49 R |

FOREIGN PATENT DOCUMENTS

| | | | | |
|---|---|---|---|---|
| DE | 4218888 A1 | * | 12/1993 | H02K/29/06 |
| WO | 9103098 A1 | * | 10/1991 | H02K/37/06 |
| WO | 9925057 A1 | * | 5/1999 | H02K/29/06 |

* cited by examiner

*Primary Examiner*—Burton Mullins
(74) *Attorney, Agent, or Firm*—Mark Levy & Associates; David L. Banner

(57) ABSTRACT

The present invention provides an external rotor stepper motor consisting of four individual, independently controlled, co-planar stepper motors optimized for vehicle direct wheel drive applications. The innovative design eliminates the need for bifilar coil winding, each of the motors' coils being single conductor, each coil being wound in the same direction throughout the entire motor. Each of the four independent motors is simultaneously energized. Because adjacent, outside coils of adjacent motors are simultaneously energized at the same polarity, there is substantially no energy wasting cancellation of magnetic flux. Carefully chosen radially spacing of the four independent, co-planar motors also eliminates substantially all flux interaction between the motors. Because similar coils of the four motors are all connected in parallel, the net inductance presented driver circuits is minimized. This yields fast rise time pulses and improved efficiency through minimized reactance of the motor.

33 Claims, 11 Drawing Sheets

STEPPER MOTOR FOR VEHICLE PROPULSION BY DIRECT WHEEL DRIVE

FIELD OF THE INVENTION

The present invention relates to the field of stepper motors and, more particularly, to a multi-phase stepper motor having an outer rotor adapted for directly driving a vehicle wheel.

BACKGROUND OF THE INVENTION

In response to environmental and geopolitical problems, it has become of some urgency to make available motor vehicles consuming relatively less fossil fuel than current fossil-fuel vehicles. While the ultimate target remains "zero-emissions" vehicles that utilize virtually no fossil fuel, realization of this goal appears far-reaching because of lack of progress in development of batteries capable of propelling a vehicle for times, distances, and speeds the driving public has come to expect.

It is now believed that in the interim, hybrid vehicles utilizing a combination of fossil-fueled engines and electric drive means may well be the answer, falling short of "zero-emissions," but nevertheless greatly increasing the distance one can travel on a gallon of fossil fuel. One such concept includes providing an electric motor for each wheel, the motors being driven by a generator, which, in turn, is driven by a fossil-fuel engine. In such an instance, the engine can be run solely for the benefit of the generator and therefore, can be small and run at a constant, most efficient speed, greatly reducing fossil fuel requirements. To reduce the fossil fuel requirements further, it is necessary that the wheel motors be as efficient as possible.

Two types of rotary electrical motors have been heretofore considered—axial permanent magnet motors and radial permanent magnet motors. Numerous examples of both types appear in the prior art. Typically, axial permanent magnet motors feature a stator disk, or drum, with a central opening and electrical conductor windings wound through the central opening and across the outer peripheral edge of the stator disk. The stator disk typically is fixed in place. A rotor is usually mounted on a shaft near the stator disk. The rotor is provided with permanent magnets extending radially from its center.

In operation, a polyphase alternating electrical current passed through the windings of the stator disk creates a magnetic flux, to which the permanent magnets of the rotor respond, thereby turning the rotor, the shaft to which the rotor is fixed, and the vehicle wheel. The portion of the windings overlying the outer peripheral edge of the stator disk does not accomplish useful work. The magnetic field generated by the windings on the outer peripheral edge of the stator is not coupled with any of the permanent magnets in the rotor and is therefore wasted.

In general, in radial permanent magnet motors, the stator is annularly shaped and is concentrically disposed around a generally cylindrically shaped rotor. The stator is provided with electrically conductive windings wound about and in between teeth, which extend radially inwardly from the stator toward the rotor. Portions of the windings ("end-turn wire") extend around the outer periphery of the stator. The rotor is provided with permanent magnets of alternating polarity disposed around the periphery of the rotor. The permanent magnets of the rotor react to a magnetic field created by current through the stator windings to cause the rotor to turn. The rotor generally is connected to a shaft, which turns with the rotor and accomplishes work. In the radial motor, the end-turn wires of the stator are not useful in creating the magnetic field that couples with the rotor permanent magnets.

Thus, there is a need for an efficient, electrically powered motor-wheel for vehicles and there is a need for more efficient motor components for use in such a vehicle wheel.

Stepper motors have been utilized since the 1940s to provide readily controllable, angular motion for a wide variety of applications. Heretofore, stepper motor designs were incapable of providing the necessary torque and electrical efficiency necessary for direct-drive vehicle wheel applications. In addition, stepper motors have required complex control and driver systems, which have also limited their application to direct-drive wheel motor applications. The inventive motor and controller designs, however, overcome these torque, efficiency, and control limitations of the prior art and provide a simple, low-cost, high-efficiency, high torque motor which is easily controlled and driven. The inventive motor design is optimized for direct-drive vehicle applications.

DISCUSSION OF THE RELATED ART

Several attempts at designing electric, direct-drive wheel motors for vehicles have been made.

U.S. Pat. No. 5,584,902 for SELF-PROPELLED WHEEL FOR WHEELED VEHICLES, issued Apr. 20, 1999 to Chahee P. Cho teaches one such motor. CHO, however, teaches an axial, permanent magnet motor having a stator drum fixed to an axle and a wheel hub and rim rotatably mounted to the axle. Permanent magnets are fixed on the wheel and oppose an outer lateral face of the stator drum. Excitation of the stator drum causes the permanent magnets, and thereby the wheel, to rotate. The CHO motor, while having a similar function to the stepper motor of the invention, has a totally different rotor (i.e., wheel) and stator structure, and is not a stepper motor. In addition, neither a sensor system (i.e., concentric rings of sensors) nor a detented parking brake arrangement are shown or suggested in CHO.

Another motor similar to the CHO motor is taught in U.S. Pat. No. 5,509,492 for DRIVE INCLUDING AN EXTERNAL ROTOR MOTOR, issued Apr. 23, 1996 to Bernd Pfannschmidt. The PFANNSCHMIDT motor, while serving a similar function to the inventive motor is still not a stepper motor. Like CHO, PFANNSCHMIDT neither teaches nor suggests either a sensor system (i.e., concentric rings of sensors) or a detented parking brake arrangement.

None of the prior art, individually or taken in combination, is seen to anticipate or suggest the stepper motor of the present invention.

SUMMARY OF THE INVENTION

In accordance with the present invention, there is provided an external rotor stepper motor consisting of four individual, independently controlled, co-planar stepper motors optimized for vehicle direct wheel drive applications. The innovative design eliminates the need for bifilar coil winding, each of the motor coils being wound with a single conductor, each coil also being wound in the same direction throughout the entire motor. The space between pole pieces of the motor allows the individual coils to be prewound and installed on the motor pole pieces during motor assembly. Each of the four independent motors is simultaneously energized.

Because adjacent, outside coils of adjacent motors are simultaneously energized at the same polarity, there is substantially no energy wasting cancellation of magnetic flux. Carefully chosen radial spacing of the four independent, co-planar motors also eliminates substantially all flux interaction between the motors. Because similar coils of the four motors are all connected in parallel, the net inductance presented to driver circuits is minimized. This yields fast rise time pulses and improved efficiency through minimized reactance of the motor. The physical dimensions of the motor have been chosen to provide a motor suitable for directly driving a vehicle wheel.

It is therefore an object of the invention to provide an external rotor stepper motor for direct drive of a vehicle wheel.

It is another object of the invention to provide an external rotor stepper motor having multiple, individual, independent coplanar stepper motors.

It is a further object of the invention to provide an external rotor stepper motor in which all coils are wound in the same direction for manufacturing economy.

It is an additional object of the invention to provide an external rotor stepper motor having single conductor (i.e., non-bifilar) coil windings.

It is another object of the invention to provide an external rotor stepper motor having coils that may be pre-fabricated and slid onto the stator during assembly.

It is a still further object of the invention to provide an external rotor stepper motor having concentric rings of sensors disposed in the external rotor to control drive to the stepper motor.

It is another object of the invention to provide an external rotor stepper motor having concentric rings of sensors disposed in the external rotor to allow smooth starts of the stepper motor by selecting an optimum initial energization for the stepper motor.

It is yet another object of the invention to provide an external rotor stepper motor having a plunger and detent to mechanically hold the rotor of the stepper motor when the motor is deenergized.

It is a still further object of the invention to provide an external rotor stepper motor having a controller using lead angle modulation to maximize the torque of the stepper motor as a function of motor speed.

It is another object of the invention to provide an external rotor stepper motor controller that recaptures kinetic energy from the stepper motor during braking and coasting of the motor.

It is an additional object of the invention to provide an external rotor stepper motor that may be stacked into multi-motor units for increased power output.

It is a further object of the invention to provide an external rotor stepper motor wherein a stack of the motors may be used to provide a central power plant for a motor vehicle.

BRIEF DESCRIPTION OF THE DRAWINGS

A complete understanding of the present invention may be obtained by reference to the accompanying drawings, when taken in conjunction with the detailed description thereof and in which:

FIG. 3b is a schematic, cross-sectional view of one implementation of a magnetic sensor pickup of FIG. 3a shown in relation to the rotor of the motor of FIG. 2a;

FIG. 3d is a schematic, cross-sectional view of an alternate implementation of a magnetic sensor pickup of FIG. 3c shown in relation to the rotor of the motor of FIG. 2a;

FIG. 5 is an electrical schematic diagram showing a possible driver configuration for use with the motor of FIG. 2a;

DESCRIPTION OF THE PREFERRED EMBODIMENT

The present invention relates to a stepper motor having an external rotor adapted for direct wheel drive in traction and other similar applications. Unlike polyphase stepper motors of the prior art, the motor of the present invention uses four independent, coplanar 30 stepper motors dispersed radially. All stator pole pieces of each independent motor are adjacent one another. In other words, all pole pieces of motor "A" are grouped, all pole pieces of motor "B" are also grouped, etc.

Figure 1:
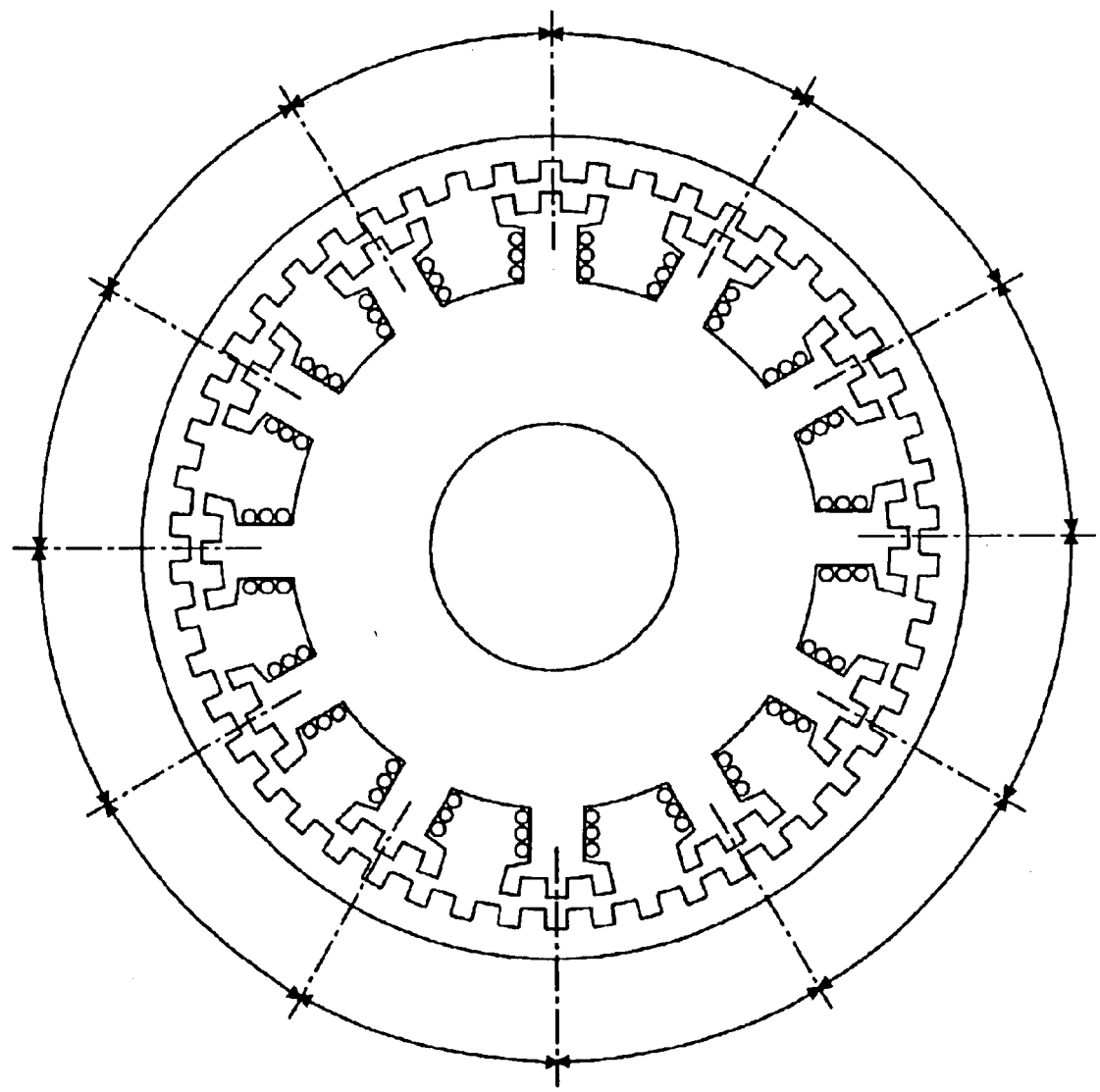
FIG. 1 is an axially oriented, cross-sectional, schematic view of a typical conventional 30, external rotor stepper of the prior art.

Referring first to FIG. 1, there is shown an axially oriented, cross-sectional view of a typical conventional 30, external rotor stepper motor of the prior art, generally at reference number 100. Stepper motor 100 has a stator 102 having 12 pole pieces 104, each pole piece 104 having three teeth 106 disposed on an outward surface thereof. An external rotor 108 is arranged concentrically around the stator 102, the rotor 108 having teeth 110 on an inner surface thereof, adapted for interaction with teeth 106 on the pole pieces 104 of the stator 102. Coils 112 are wound around a central region 114 of the pole pieces 104. Coils 112, which appear in cross section in FIG. 1, are typically wound in a bifilar fashion to allow finer rotational control of the rotor 108 (e.g., microstepping). Pole pieces 104 containing respective ones of coils 112 are labeled A1, A'1, B1, B'1, c1, C'1, A2, A'2, B2, B'2, c2, C'2, respectively. A, B, and C refer to the three phases of motor 100. It will be noted that phase A is divided into A1 and A2 portions, each portion having two pole pieces 104 diametrically opposed to one another. Likewise, phases B and C are also split and diametrically opposed.

It will be noted that pole pieces 104 as substantially equidistantly distributed around the perimeter of the stator 102. This is the conventional approach to stepper motor design. Unlike the stepper motor of the invention, stepper motor 100 is a single stepper motor having three phase components. The inventive stepper motor disclosed hereinbelow deviates significantly from this prior art arrangement and consists of four individual, self-contained, coplanar, 30 stepper motors.

In operation, prior art motor 100 is rotated by sequentially energizing coils 112 as is well known to those of skill in the stepper motor arts.

Figure 2A:
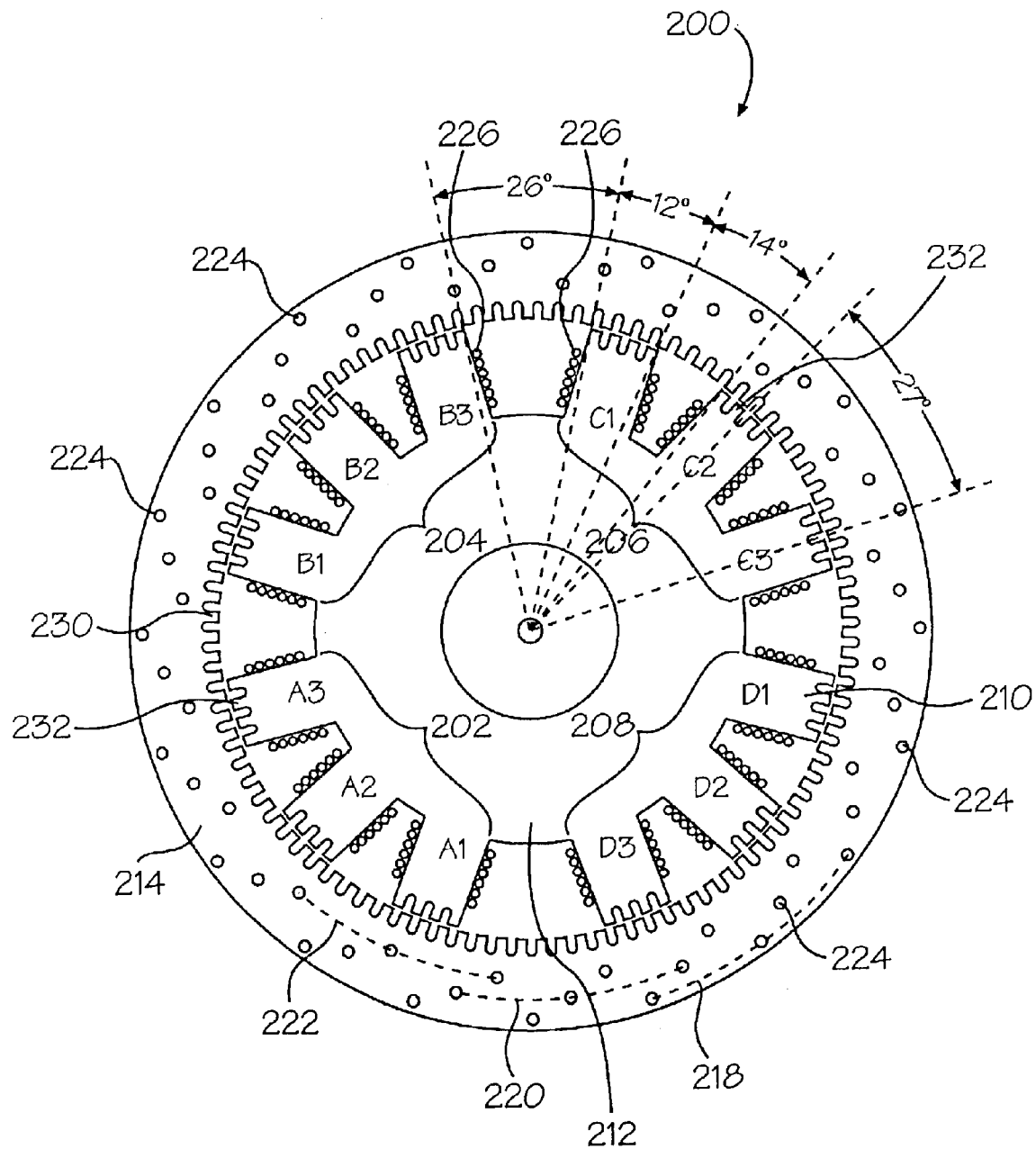
FIG. 2a is an axially oriented, cross-sectional, schematic view of the four-section stepper motor of the invention.

Referring now to FIG. 2a, there is shown an axial sectional view of the stepper motor of the invention, generally at reference no. 200. The four discrete motors 202, 204, 206, 208, labeled A, B, C, and D, respectively, each have three pole pieces 210 in the stator 212. The chosen shape of pole pieces is stubby" (i.e., short and fat) to minimize instability caused by their vibration. Longer pole pieces 210 of the prior art were more prone to such vibrations because of their length. Pole pieces 210 are cantilevered from their attachment to the body of stator 212.

In the embodiment chosen for purposes of disclosure, each pole piece 210 has four teeth 232. The three pole pieces 210 for each motor 202, 204, 206, 208 are spaced apart approximately 26° from one another. Individual pole pieces 210 within each of the motors 202, 204, 206, 208 are separated from each other by approximately 14°. This means that the radial gap between pole pieces 210 within each motor 202, 204, 206, 208 is slightly wider than the approximately 12° width of each pole piece 210 itself. This arrangement provides a short flux path and keeps most of the flux generated by each coil 226 contained substantially within the particular pole piece 210 upon which that coil 226 is wound.

In addition, the wide spaces separating pole pieces 210 facilitate the installation of the coils 226 during manufacturing. These large gaps between pole pieces allow the coils 226 to be wound externally and then slipped over the pole pieces 210. In prior art motors having smaller spaces between pole pieces, it was necessary to wind the motor coils in situ, a more costly process. In situ winding makes factory rework more difficult and probably precludes field servicing of the motor 200, if or when necessary.

The sets of three pole pieces 210 forming the stator 212 portion of each of the four motors 202, 204, 206, 208 are not disposed equidistantly around the circumference of the stator 212 but rather have a gap of approximately 25° between the outer, adjacent pole pieces 210 of any two adjacent motors 202, 204, 206, 208. This gap in spacing ensures that there is substantially no interaction of flux (i.e., primarily residual flux) in the rotor 214 generated by each of two adjacent motors 202, 204, 206, 208. In other words, the magnetic flux generated by each of the four motors 202, 204, 206, 208 is substantially self-contained. It is estimated that a lamination stack thickness of approximately two inches for the stator 212 and the rotor 214 will produce motors 200 having sufficient torque that four motors 200 (i.e., one on each vehicle wheel) is sufficient to adequately power a passenger vehicle such as a car. Of course, other motor configurations. (e.g., greater lamination height) could be provided for lower or higher torque applications.

The external rotor 214 is disposed concentrically with the stator 212. It is anticipated that a gap of approximately 0.005 inch will be provided between the stator 212 and the rotor 214. In the embodiment chosen for purposes of disclosure, the rotor 214 contains 99 teeth 230. It will be recognized that the inventive principles described herein are not limited to the particular embodiment chosen for purposes of disclosure but that the principles may readily be expanded to other configurations. Therefore, the invention is not considered limited to a rotor having 99 teeth 230.

In the embodiment chosen for purposes of disclosure, the rotor 214 has an inner diameter of approximately 12 inches and an outer diameter of approximately IS inches. The choice of the number of teeth 230 allows the necessary offsets of teeth 230 to enable the stepper motor 200 to rotate. For example, by choosing 99 teeth 230, when the teeth 232 of the pole pieces 210 designated A2, B2, C2 and D2 are directly aligned with corresponding teeth 230 in the rotor 214, the teeth 230 of the rotor 214 are misaligned with the teeth 232 of the pole pieces 210 designated A1, B1, C1, and D1 by two-thirds of a tooth pitch. In other words, only one-third the width of teeth 230 of the rotor 214 is aligned with corresponding the teeth 232 of the stator 212. Likewise, there is a one-third of a tooth pitch misalignment between the pole pieces' teeth 230 of the rotor 214 and the corresponding teeth 232 of the pole pieces 210 designated A3, B3, C3, and D3. In this case, only one-third the width of the teeth 230 of the rotor 214 overlaps their corresponding teeth 232 of the stator 212.

It is desirable for reasons that will be described hereinbelow that the number of teeth 230 on the rotor 214 be an integral multiple of the number of pole pieces 210 in each motor 202, 204, 206, 208. It will be recognized that other numbers of teeth 230 could be chosen in designs adapted for other operating circumstances or environments.

Sensors or sensor actuators 224 are disposed in three concentric rings 218, 220, 222 in the approximately 1.5 inch space 216 (calculated as 0.5×(15−12)) between the inner and outer diameters of the rotor 214. Each concentric ring 218, 220, 222 of the sensors 224 typically consists of 18 sensors uniformly disposed therearound. The sensors 224 in each concentric ring 218, 220, 222 are, therefore, disposed radially approximately 20° from one another but are offset approximately 6.67° from corresponding sensors in other concentric rings 218, 220, 222.

Because of the nature of stepper motors when stopped, the rotor 214 and the stator 212 will be locked (i.e., detented) in one of a number of discrete positions relative to one another. The number of sensors 224 is chosen such that at any of these detented positions, at least one of the sensors 224 in one of the concentric rings 218, 220, 222 will be activated. The operation of the sensors 224 in cooperation with a stepper motor controller will be described in detail hereinbelow. One ring 218, 220, 222 of the sensors 224 is provided for each pole piece 210 of each motor 202, 204, 206, 208. In alternate embodiments, the inventive stepper motor could be formed from individual stepper motors having structures other than the 3Ø structure and other numbers of bands of sensors could be utilized. Likewise, it is possible to implement the inventive stepper motor with fewer than three bands of sensors. Consequently, the invention is not considered limited to the number of sensors or the number of bands of sensors chosen for purposes of disclosure.

Refer now also to FIGS. 3a–3d. While it is likely that the rotor 214 will carry a sensor actuator (not specifically identified), for example, a hole serving as an actuating part of a see-through sensor system, etc., the term sensor will be used throughout whether an actual sensor or an actuator for a sensor is placed on the rotor 214.

Typically, in a vehicle environment, a sensor system relatively immune to dirt, temperature variation, and vibration is required. One sensor system deemed suitable for use in the vehicle wheel application is a magnetic sensor system. A series of raised bumps, dimples, or other projections (identified as "sensors" 224, 224') on rotor 214 could interact with a stationary pick-up coil 240 adjacent the rotor 214.

There are sensor systems well known to those skilled in the art wherein a pickup coil 240 is supplied with a high frequency AC signal (not shown)—a 1 KHz signal, for example. Pickup coil 240, could be wound on the center leg of a steel or ferrite yoke 242, 242'. While ferrite might be chosen because of its high magnetic permeability, non-existent eddy current losses, ease of manufacturing, and low cost, it is believed that at the extremely low temperatures possibly encountered in a vehicle wheel environment, ferrite could potentially become too brittle and fail in service. Rather, traditional E-cores formed from laminations may be preferred. M-27 Silicon steel laminations having a thickness in the range of 0.004 inch are known and appear suitable for constructing yoke 242. It will be recognized that other materials, yoke shapes, and lamination thicknesses could be chosen to satisfy a particular operating circumstance or environment.

Figure 3A:
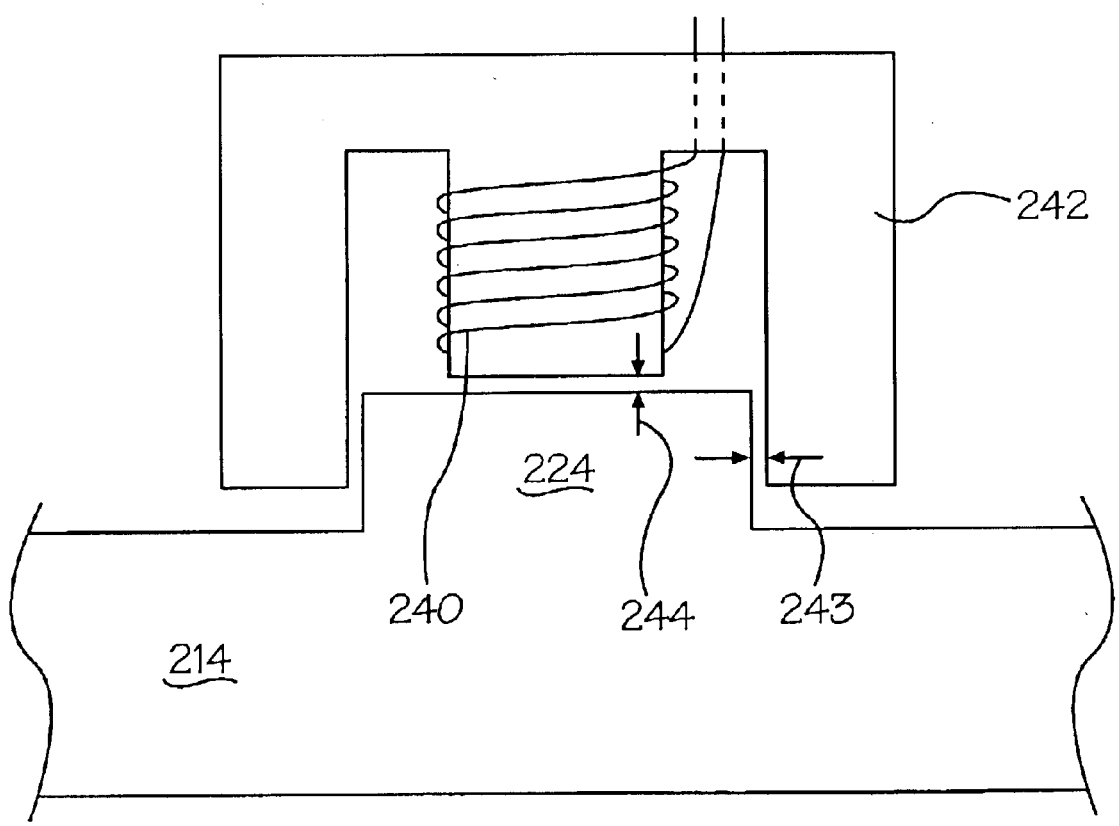
FIG. 3a is a schematic, cross-sectional view of one implementation of a magnetic sensor pickup.
Figure 3B:
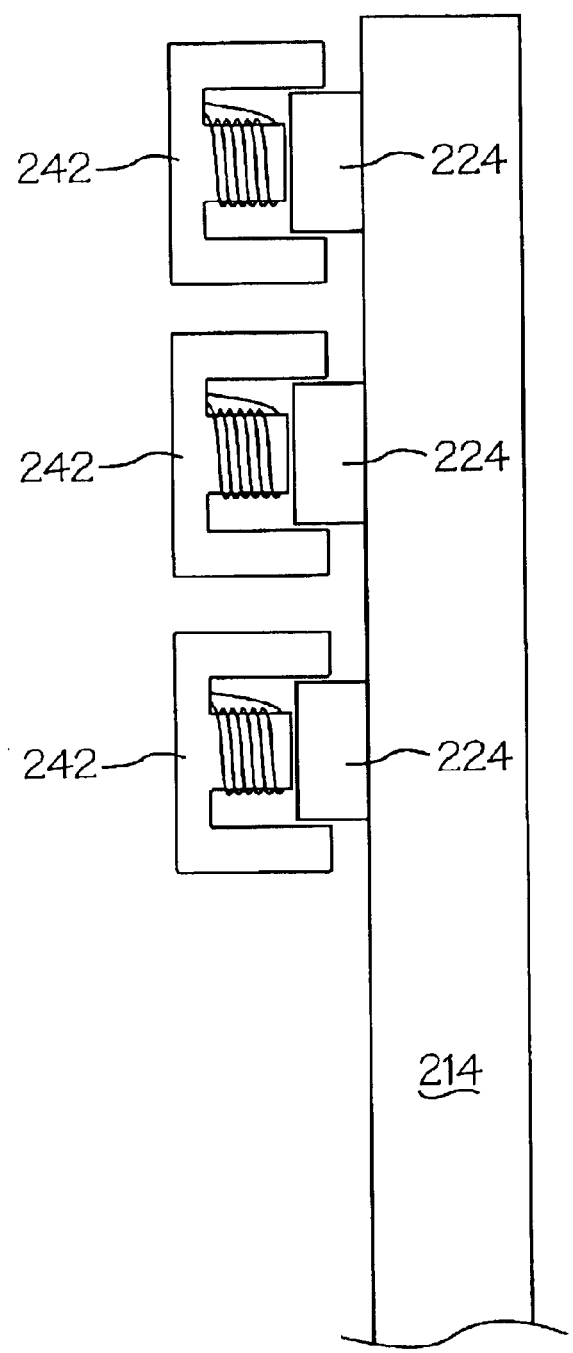
Figure 3C:
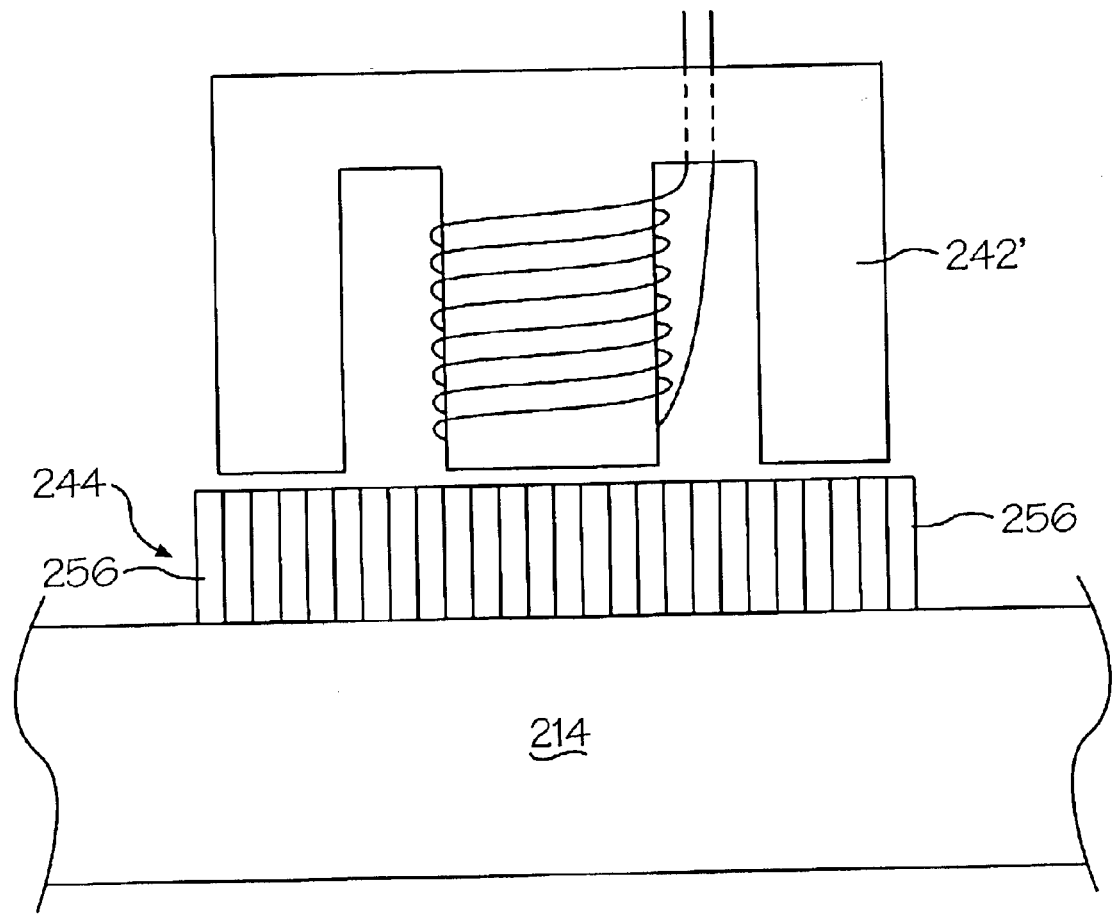
FIG. 3c is a schematic, cross-sectional view of an alternate implementation of a magnetic sensor pickup.
Figure 3D:
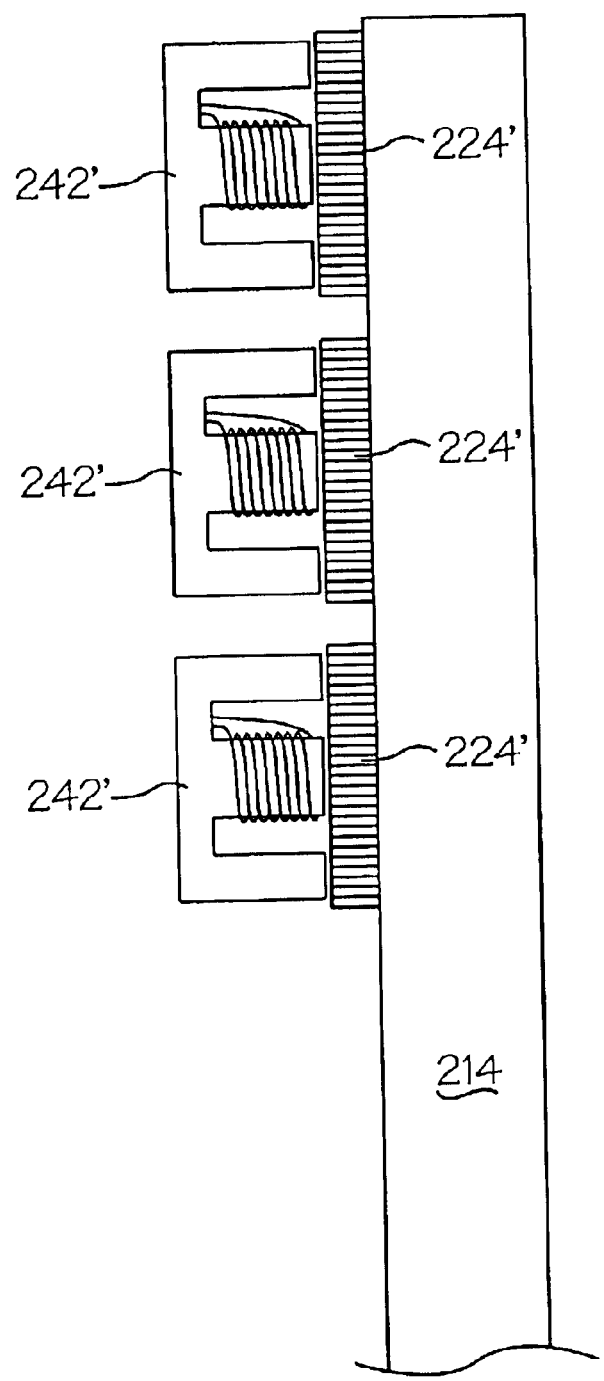

It is desirable to have sensors 224, 224' pass as closely as possible to the core 240. In the embodiment of FIGS. 3a and 3b, typical air gaps 243 and 244 may be approximately 0.020 inch. As the raised bumps (i.e., sensors 224) on the rotor 214 pass the pick-up coil 240, the magnetic interaction with the pick-up coil 240 is readily detected. FIG. 3b shows a schematic representation of three assemblies of yoke 242 and coil 240 of FIG. 3a interacting with sensors 224 in concentric bands 218, 220, 222.

There is a high potential for vibration in the vehicle wheel environment, which could result in possible variation in the relative positions of the sensor actuators 224 on rotor 214 and pickup-up coil 240. Consequently, an alternate embodiment (FIGS. 3c, 3d) uses sensor actuators 224' consisting of rectangular bars of laminated silicon steel or other high-permeability material cemented or otherwise affixed to the face of the rotor 214. Laminations 256 minimize eddy currents in sensor actuators 224'. It will be recognized that other material and/or other shapes of laminated or non-laminated material could also be used to implement sensor actuators 224'.

Other suitable sensor systems meeting these requirements are also well known to those of skill in the art and any suitable sensor may be used to produce a sensed output as will be described in detail hereinbelow.

Each pole piece 210 has a coil 226 wound thereupon. Unlike stepper motors of the prior art, the coils 226 are wound from a single conductor (i.e., are not bifilar windings typically formed by winding two parallel conductors), and wound in the same direction on each pole piece 210. By altering control electronics, it is possible to use bifilar-wound coils as well but single layer coils are considered preferable. By using single layer coils, larger diameter (i.e., smaller AWG number) wire may be used. This lowers the DC resistance of coils 226, which also improves the overall efficiency of motor 200.

Windings 226 may be wound externally to stepper motor 200 and the pre-wound coils then slipped over pole pieces 210 during motor assembly. The windings may be secured to pole pieces 210 using any suitable means. Coils 226 may be retained on pole pieces 210 in any suitable manner such as a detented retention arrangement (not shown), a clip or other fastener (not shown), or by a suitable adhesive. A removable retention arrangement such as a detent system is preferred to facilitate rework of motors during manufacturing or to allow easy field replacement of one or more coils 226. This approach appears to provide a low manufacturing cost for windings 210.

Adjacent ones of the coils 210 will always be energized at the same polarity and all energized coils are designed for connection in parallel to present the minimum load inductance to the driver circuits. This results in minimized current rise times, which allows the stepper motor 200 to respond more quickly to energization signals. Heating of the coils 210 is also thereby minimized, again contributing to a high efficiency motor design. As already discussed, the physical separation of pole pieces 210 in individual motors 202 and the separation of the motors 202 from one another contains flux and minimizes eddy currents. This also contributes to motor efficiencies by substantially eliminating minor losses caused by heating any eddy currents.

Figure 5:
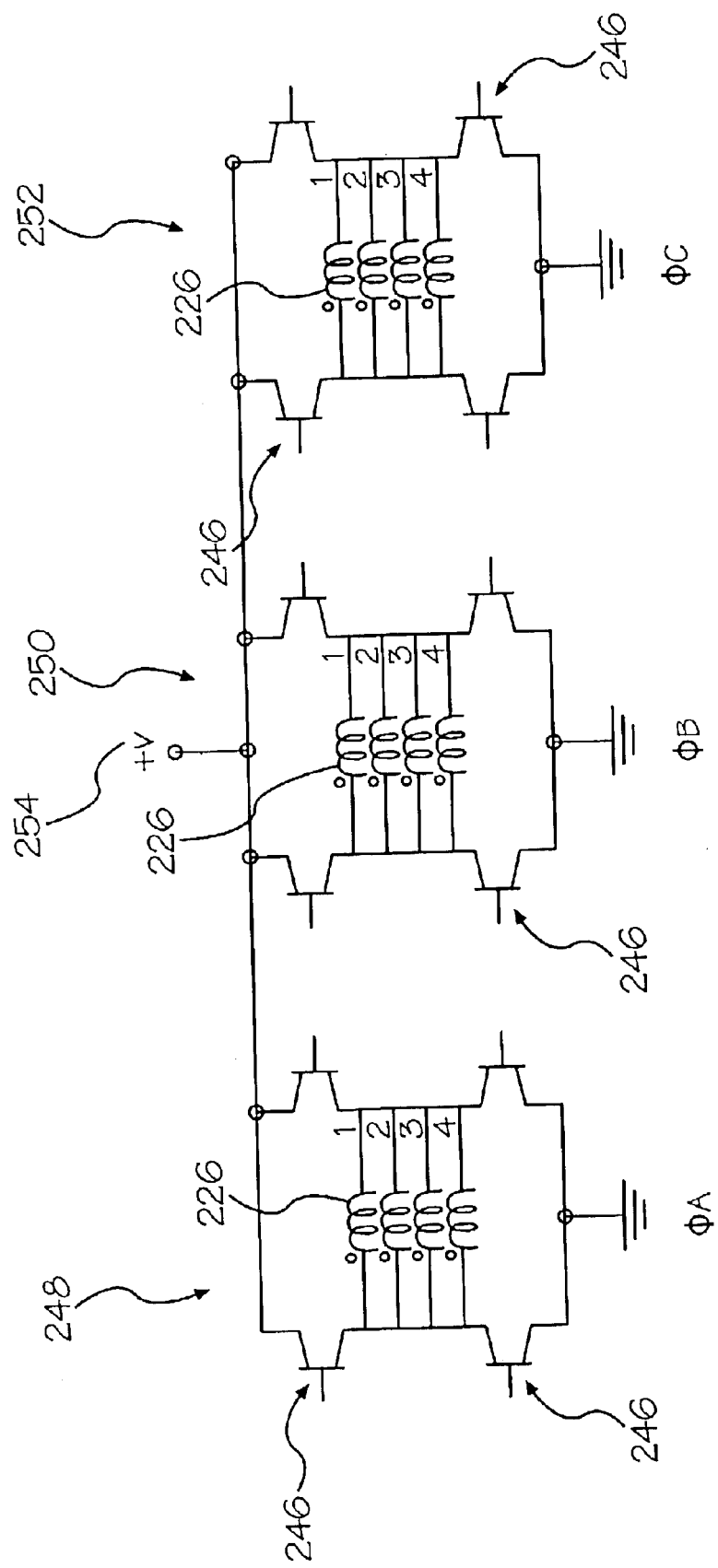
Figure 7:
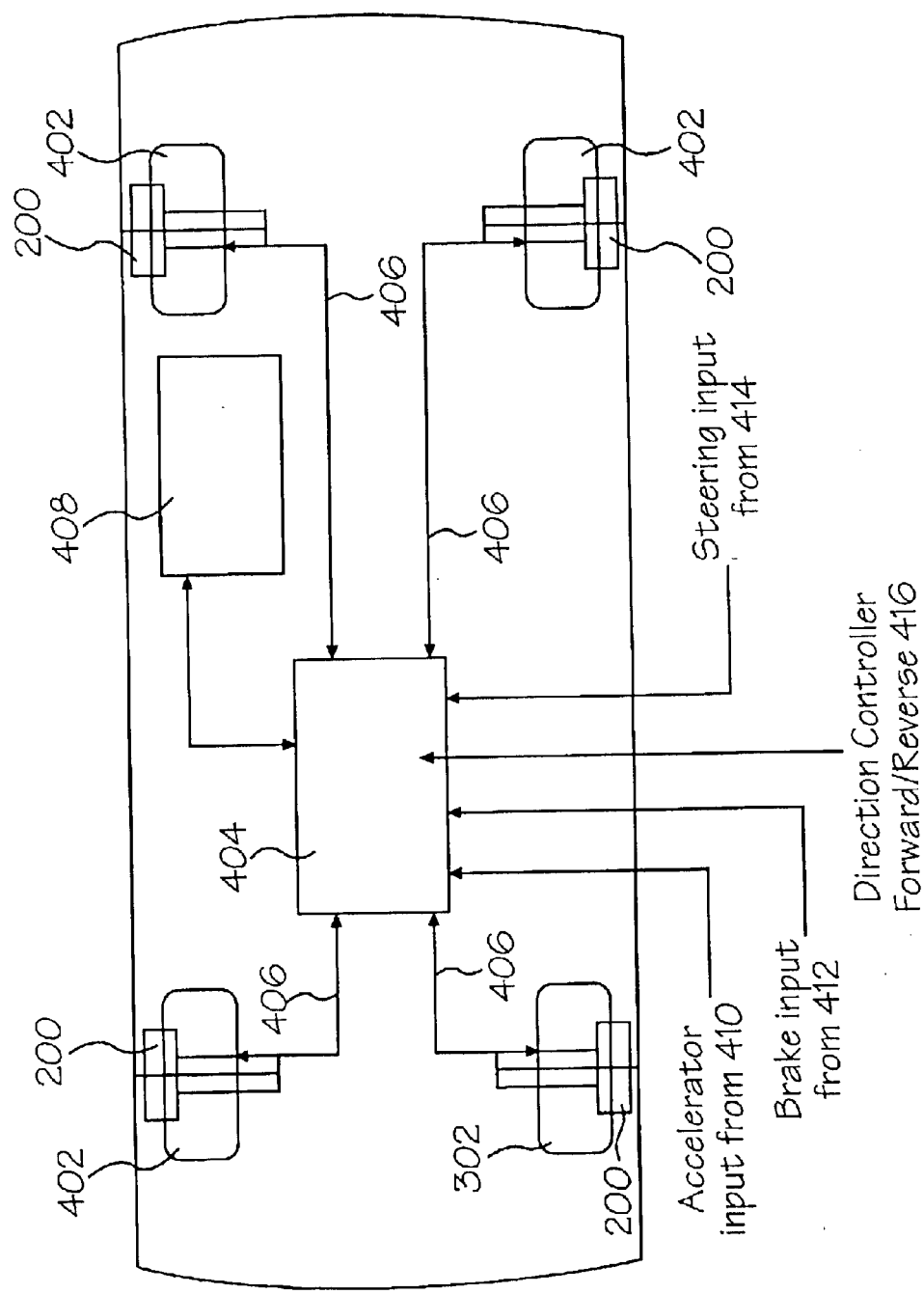
FIG. 7 is a schematic block diagram of the vehicle of FIG. 6.

Referring now also to FIG. 5, there is shown an electrical schematic diagram of one possible drive configuration for motor 200. Each coil 226 associated with pole pieces 210 designated A1 B1 C1 D1 are connected in parallel in a drive group 248. Likewise, coils 226 associated with pole pieces 210 designated A2, B2, C2, and D2 are parallel-connected in drive group 250. Finally, coils 226 associated with pole pieces 210 designated A3, B3, C3, and D3 are parallel-connected in drive group 252. Each drive group 248, 250, 252 contains four transistors 246 which act as switching elements to power their respective sets of coils 226. Power for energizing coils 226 through transistors 246 comes from a power source 254 designated +V. +V 254 is typically supplied in vehicular applications from the battery 308 (FIG. 7).

The use of a variable voltage power supply to the motor 200 is highly desirable. Voltage may be controlled responsive to rotational speed of the motor 200, increasing voltage being applied as the rotational speed increases. This allows a lower voltage to be applied when the motor 200 is at rest thereby helping to eliminate bolting (i.e., a jerky, lurching) starts as the motor 200 is started. In effect, the motor 200 may be supplied by a substantially constant current, regardless of its rotational speed. Controller 304 (FIG. 7) may be designed to provide such a variable voltage power supply.

Figure 2B:
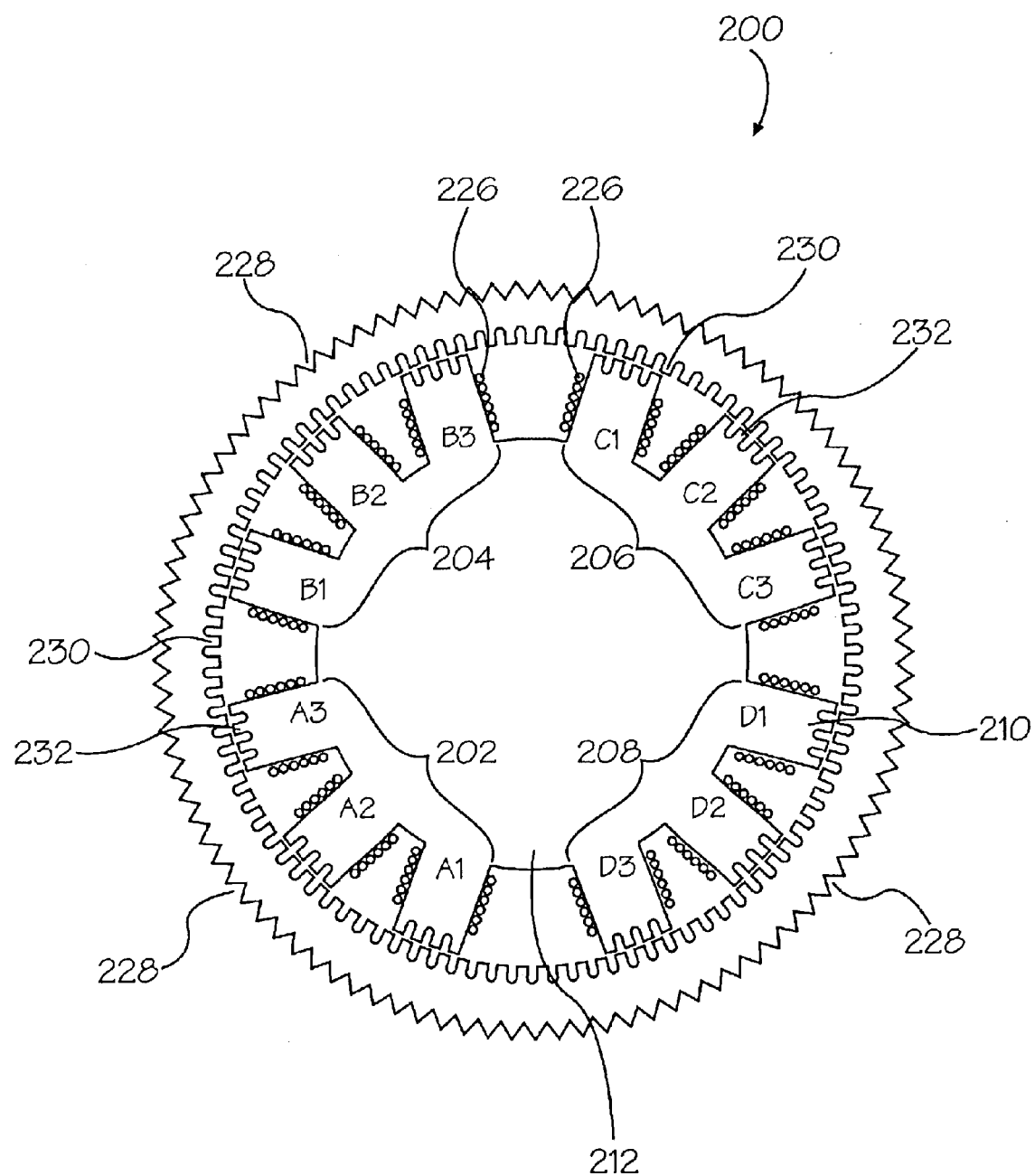
FIG. 2b is an axially oriented, cross-sectional, schematic view of the four-section stepper motor of FIG. 2a showing detents in the perimeter of the rotor.
Figure 4:
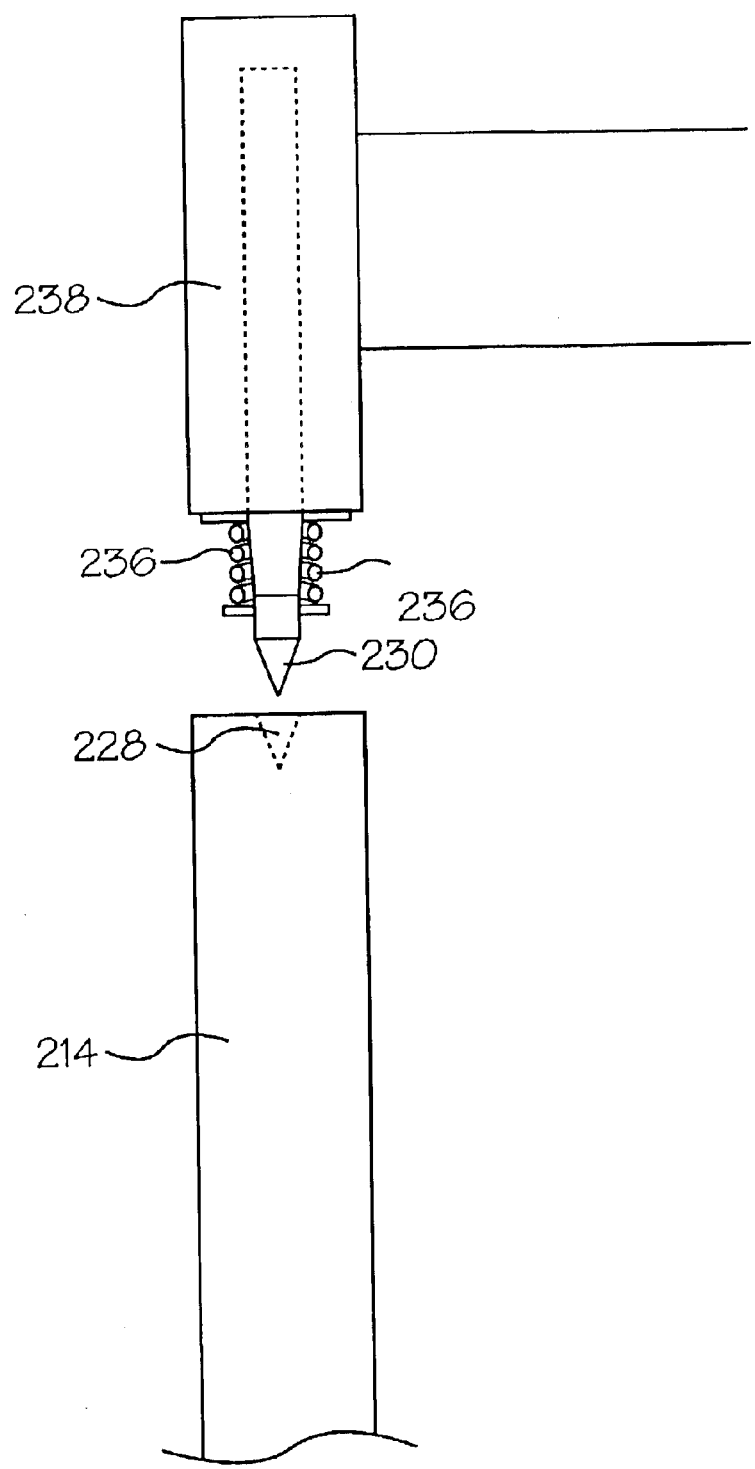
FIG. 4 is schematic view showing a detented parking brake suitable for use with the motor of FIG. 2b.

Refer now to FIGS. 2b and 4. A series of 99 V-shaped detents 228 are spaced around the perimeter of the rotor 214. These are adapted to receive a mating plunger 230 disposed externally to the stator 212, actuatable after the stepper motor 200 has been deenergized. It will be recognized that the plunger 230 may be affixed to any stationary portion of a vehicle proximate the rotor 214. It will also be recognized that more than one plunger 230 may be used to further secure the rotor 214 when the motor 200 is in an energized state. The interaction of one or more of the plungers 230 with respective ones of the detents 228 provides a mechanical "parking" brake function. In the anticipated application as a direct-drive wheel motor for a vehicle, the activation of the detent 228/plunger 230 system would keep a vehicle from rolling once the stepper motors 200 were deenergized. Plunger 230/detent 228 combinations could be implemented in a variety of ways. One simple way would be to have plungers 230 biased by a spring 236 towards detents 228. A solenoid 238 or similar coil could counteract the biasing force of the spring 236 and hold plungers in a withdrawn position when the motor 200 was rotating. In alternate embodiments, detents 228 could be formed in a sprocket, not shown, axially aligned with the rotor 214 rather than in the periphery of the rotor 214.

The four independent motors 202, 204, 206, 208 are designed for simultaneous operation. The coils 210 are, for purposes of operational description, designated A1, B2, C3, etc., coil A1 being associated with the first pole piece 210 of the motor A (reference no. 202), etc. The anticipated energization sequence of the coils 226 (for forward motion) is:

| | | | |
|---|---|---|---|
| A1, A2 | B1, B2 | C1, C2 | D1, D2 |
| A2, A3 | B2, B3 | C2, C3 | D2, D3 |
| A3, A1 | B3, B1 | C3, C1 | D3, D1 |
| A1, A2 | B1, B2 | C1, C2 | D1, D2 |
| A2, A3 | B2, B3 | C2, C3 | D2, D3 |
| A3, A1 | B3, B1 | C3, C1 | D3, D1, etc. |

It will be recognized that reversing the energization sequence will allow the rotor 214 to rotate in the opposite direction.

Coils A1, B1, C1, and D1 are connected in parallel. Likewise, coils A2, B2, C2, and D2 as well as A3, B3, C3, and D3 are also connected in parallel.

The placement of sensors 224 allows a motor control system (described in detail hereinbelow) to ascertain an exact position of the rotor 214 relative to the stator 212 under any condition. The exact location of the rotor 214 is particularly important when the motor is at rest. The motor controller, having ascertained the exact position of the rotor 214 relative to the stator 212, can provide an initial energization that prevents a sudden jerk, which could occur if an initial energization was arbitrary regardless of the rotor 214/stator 212 positional relationship.

In operation, coil switching is accomplished responsive to signals from the sensors 224. As the motor 200 rotates, successive ones of the sensors are "made." As each successive sensor is made, the currently energized coils are deenergized and the next series of coils are energized.

The particular embodiment of the stepper motor 200 chosen for purposes of disclosure is designed according to the following assumption and suppositions. First, it is assumed that the wheel outer diameter D is approximately 15 inches. This provides a perimeter according to S=·×D of approximately 47.12 inches or approximately 3.9 feet per motor revolution. Because a mile equals approximately 5,280 feet, the stepper motor 200 must revolve approximately 1,354 revolutions/mile. At a speed, for example, of 70 miles per hour (mph), the stepper motor 200 must rotate approximately 94,769 revolutions/hour. Because the rotor 214 is equipped with 99 teeth and is a 30 motor, this means that the motor 200 must step at the rate of approximately 8,213 steps/second, a rate within the capability of the stepper motor 200 and conventional controller technology.

Figure 6:
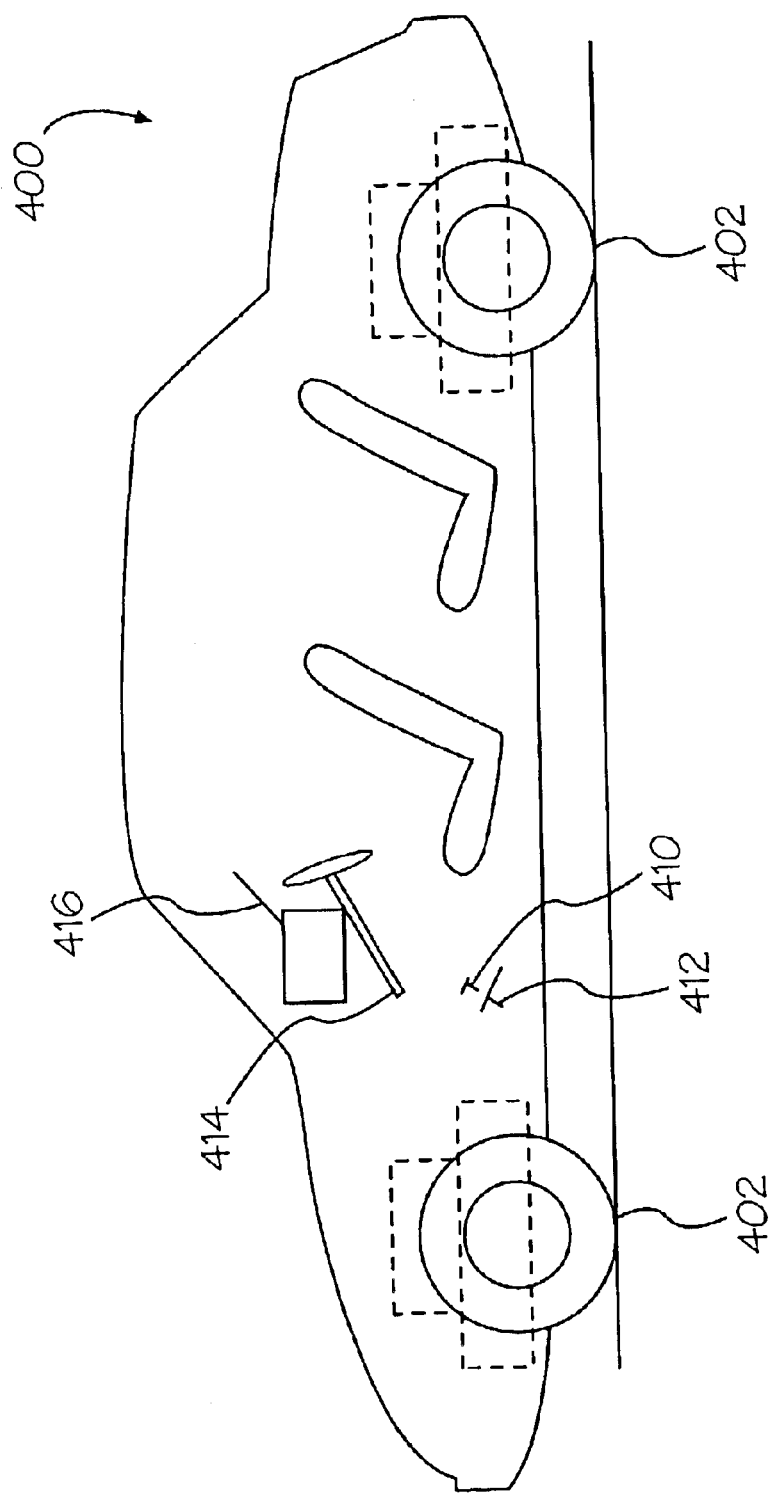
FIG. 6 is a schematic, cross-sectional view of a motor vehicle equipped with the composite, external rotor stepper motor of the invention.

Referring now to FIGS. 6 and 7, a side, schematic view and a functional block diagram are shown of a simple wheeled land vehicle 400—a car, for example. Four wheels 402 are disposed at the four corners of the vehicle 400, each of the wheels 402 equipped with a stepper motor 200 as described hereinabove. Each motor 200 is connected to a controller 404 by interconnections 406. Each interconnection 406 may include a power connection, sensor connections, activation lines for brake devices including the detents 228 (FIG. 4) and plungers 230 (FIG. 4), and any other power or communications interconnections needed.

Power to energize the motors 200 flows outward over interconnection 406 and generated power from the motors 200 flows inward when the vehicle 400 is in a braking or regenerating mode. A battery 408 is connected to the controller 404 and provides power for the motors 200. It will be understood that the battery 408 must be charged, either by an on-board or an external power source (not shown). No power source or charging controller is shown, as the actual source of power for charging the battery 408 forms no part of the present invention. It will be recognized that the controller 404 includes the necessary componentry (not shown) to manage charging of the battery 408.

Controller 404 is adapted to receive sensor input from the sensors 224 (FIG. 2) disposed in each of the motors 200. In addition, the controller 402 is connected to the accelerator 410, brake pedal 412, steering mechanism 414, and direction controller 416.

When vehicle 400 is stopped and the vehicle is "turned off," the controller 402 actuates the plungers 230 (FIG. 2) allowing them to enter the detents 228 (FIG. 2), thereby providing a parking brake function for the wheels 402. It will be recognized that this parking brake function may be implemented on any combination of wheels 402, not necessarily on all four wheels 402 chosen for purposes of disclosure.

Control of the stepper motor is particularly easy because of the simplified energization scheme described hereinabove. Of course, the energization sequence is merely reversed to cause the vehicle 400 to travel in reverse. A simple direction control 416 in the cab of the vehicle 400 may be used to shift the vehicle 400 between a forward and reverse direction.

Refer now also to FIG. 2. The arrangement of sensors 224 in concentric rings 218, 200, and 222 guarantees that at least one sensor 224 in one of the concentric rings 218, 220, 224 will be active (i.e., "made") when the rotor 214 of the motor 200 is at rest. This allows the controller 402 to select an appropriate initial energization for the motor 200 when the vehicle 400 is at rest. That is, if the motor 200 were to be randomly energized, the tendency would be for the vehicle 400 to lurch as the rotor 214 and the stator 212 attempted to align themselves in accordance with the energization. By selecting an optimum energization, the controller 402 ensures that starts of the vehicle 400 will be as smooth as possible.

Because each wheel 302 of the vehicle 300 may be controlled completely independently, several possibilities for vehicle are provided. First, by coupling the controller 304 to steering wheel 414, the speed of motors 200 driving the front wheels 302 may be varied so as to facilitate steering vehicle 300. Because sensors 224 associated with each wheel motor 200 provide wheel speed data to the controller 304, each motor may be controlled independently responsive to a steering signal from steering wheel 414. It will be recognized that other similar sophisticated vehicle control techniques could readily be implemented because of the totally independent wheel motor control.

Braking the vehicle 33 may also be accomplished electrically. When breaking is required as indicated by pressure on brake pedal 312, the controller 304 retards the signal from the sensors 224, thereby retarding the motors 200 and slowing the vehicle 300. A fringe benefit of this arrangement is that the kinetic energy of the vehicle 300 is recaptured as the motors 200 enter a regenerative mode (i.e., act as generators instead of motors). The generated energy from the motors 200 during braking is directed to the battery 308 by the controller 304. It is anticipated that vehicle 300 will also include conventional frictional brakes (not shown) as are well know to those skilled in the vehicle arts. These frictional brakes could be directly actuated by brake pedal 312 through a conventional hydraulic system (not shown), or, in alternate embodiments, could be electrically actuated by the controller 304 if regenerative braking was inadequate for decelerating the vehicle 300 at a sufficient rate. The frictional braking system forms no part of the present invention.

It will also be recognized that signals from the sensors 224 associated with individual wheels 202 could be used to indicate slippage during deceleration (braking). The controller 304 could readily take action thereby forming an antilock braking system (ABS) either independently, or in cooperation with a frictional braking system.

As is well known in the stepper motor arts, closed loop control generally results in superior motor control. This is true because each succeeding energization is directly controlled by positional information from one or more sensors 224. Controlling the motor(s) 200 in the vehicle 400 is no exception. In addition, a technique known as lead angle modulation is used to optimize the torque of the motors 200 at any operating speed. By using inputs from one or more sensors 224, the controller 402 may readily determine the rotational velocity of the rotor 214. As speed increases, the switching point for applying the energy to the next set of coils in the sequence may be varied, thereby altering the lead angle at which energy is applied to a particular combination of motor coils 226. Lead angle control may be accomplished electronically by the controller 402 by delaying a sensor signal depending upon the rotational velocity of the rotor 214. In addition, the lead angle may be varied depending upon whether the vehicle 400 is accelerating or decelerating.

While the preferred embodiment of the present invention is directed to individual wheel motors for a vehicle, it will be recognized that the inventive motors could also be axially stacked. This creates several possibilities. First, one or more motors 200 could be used on individual wheels of a vehicle for applications requiring torque. Second, multiple motors 200 could be stacked face to face to form a central power plant for a vehicle or for another application normally powered by a conventional internal combustion engine. The stacked motor could be located within a vehicle and its output coupled to the vehicle's wheel through a conventional drive train.

Since other combinations, modifications, and changes varied to fit particular operating requirements and environments will be apparent to those skilled in the art, the invention is not considered limited to the chosen preferred embodiments for purposes of this disclosure, but covers all changes and modifications which do not constitute departures from the true spirit and scope of this invention.

Having thus described the invention, what is desired to be protected by Letters Patent is presented in the subsequently appended claims.

What is claimed is:

1. An external rotor, composite stepper motor for directly driving a vehicle wheel, comprising:
   a) a stator comprising a plurality of independent, concentric, coplanar stepper motor stators, each comprising a group of adjacent pole pieces extending radially from a center of said stators and displaced from one another by a first angular displacement, each of said pole pieces comprising a predetermined number of stator teeth disposed at an outer periphery thereof, each of said independent stepper motor stators being separated from one another by a second angular displacement, said second angular displacement being larger than said first angular displacement;
   b) a coil wound on each of said pole pieces;
   c) a substantially cylindrical external rotor disposed concentrically with and adjacent to said stators and having a first face, a second face opposed to said first face, a first radius to an inner surface thereof and a second radius to an outer surface thereof, said rotor comprising a predetermined number of teeth disposed on said inner surface and adapted for magnetic interaction with said stator teeth; and
   d) a plurality of sensors disposed in a concentric ring on at least one of said first face and said second face of said rotor at a radius greater than said first radius and smaller than said second radius.

2. The external rotor, composite stepper motor for directly driving a vehicle wheel as recited in claim 1, wherein each of said coils is wound in an identical direction.

3. The external rotor, composite stepper motor for directly driving a vehicle wheel as recited in claim 1, further comprising:
   e) means for selectively energizing said coils operatively connected thereto.

4. The external rotor, composite stepper motor for directly driving a vehicle wheel as recited in claim 3, wherein each of said groups of adjacent pole pieces comprises a predetermined number n of pole pieces and said concentric ring of sensors comprises n concentric rings of sensors.

5. The external rotor, composite stepper motor for directly driving a vehicle wheel as recited in claim 4, wherein n equals three.

6. The external rotor, composite stepper motor for directly driving a vehicle wheel as recited in claim 3, wherein each of said plurality of independent, concentric, coplanar stepper motor stators defines one of m independent stepper motors.

7. The external rotor, composite stepper motor for directly driving a vehicle wheel as recited in claim 6, wherein m equals four and said independent stepper motor segments are labeled A, B, C, and D, respectively.

8. The external rotor, composite stepper motor for directly driving of a vehicle wheel as recited in claim 7, wherein n equals three and said n pole pieces and each of said coils wound thereupon in each of said four independent stepper motor segments are labeled A1, A2, A3, B1, B2, B3, C1, C2, C3, D1, D2, and D3, respectively.

9. The external rotor, composite stepper motor for directly driving of a vehicle wheel as recited in claim 8, wherein said means for energizing comprises a stepper motor driver adapted to apply energy to said coils in predetermined sequences.

10. The external rotor, composite stepper motor for directly driving of a vehicle wheel as recited in claim 9, wherein at least one coil from each of said m independent stepper motors is substantially simultaneously energized.

11. The external rotor, composite stepper motor for directly driving of a vehicle wheel as recited in claim 9, wherein said predetermined sequence are applied at a predetermined time, said time being at least partially controlled by at least one said sensors.

12. The external rotor, composite stepper motor for directly driving of a vehicle wheel as recited in claim 11, wherein said predetermined time is varied in accordance with a rotational speed of said rotor.

13. The external rotor, composite stepper motor for directly driving of a vehicle wheel as recited in claim 12, wherein said energization sequence for a first direction of rotation comprises the sequence:

| A1, A2 | B1, B2 | C1, C2 | D1, D2 . . . n1n2 |
|---|---|---|---|
| A2, A3 | B2, B3 | C2, C3 | D2, D3 . . . n2n3 |
| A3, A1 | B3, B1 | C3, C1 | D3, D1 . . . n3n1 |
| A1, A2 | B1, B2 | C1, C2 | D1, D2 . . . n1n2 |

-continued

| A2, A3 | B2, B3 | C2, C3 | D2, D3 ... n2n3 |
| A3, A1 | B3, B1 | C3, C1 | D3, D1 ... n2n1. |

14. The external rotor, composite stepper motor for directly driving of a vehicle wheel as recited in claim 13, where reversing said energization sequence causes rotation of said stepper motor in a direction opposite said first direction of rotation.

15. The external rotor, composite stepper motor for directly driving of a vehicle wheel as recited in claim 1, further comprising:
   e) a detent operatively connected to said rotor; and
   f) a plunger disposed proximate said rotor and adapted for engagement with said detent when said rotor is in a stopped state, said plunger being moveable between an engaged position and a retracted position.

16. The external rotor, composite stepper motor for directly driving a vehicle wheel as recited in claim 15, wherein said detent comprises a plurality of substantially V-shaped detents disposed in at least one of the locations: a periphery of said rotor and a sprocket axially aligned with and rigidly affixed to said rotor.

17. The external rotor, composite stepper motor for directly driving a vehicle wheel as recited in claim 16, wherein said plurality of substantially V-shaped detents comprises a number of detents substantially equal to said predetermined number of teeth of said rotor.

18. The external rotor, composite stepper motor for directly driving a vehicle wheel as recited in claim 1, wherein said predetermined number of teeth on said rotor is approximately equal to 99.

19. The external rotor, composite stepper motor for directly driving a vehicle wheel as recited in claim 1, wherein said predetermined number of stator teeth on each of said pole pieces is approximately equal to four.

20. The external rotor, composite stepper motor for directly driving a vehicle wheel as recited in claim 1, wherein said plurality of sensors comprise a plurality of sensor actuators disposed on said rotor interacting with at least one sensor disposed external to and proximate said rotor.

21. The external rotor, composite stepper motor for directly driving a vehicle wheel as recited in claim 20, wherein said plurality of sensor actuators comprise at least one of the forms: a raised dimple, and a raised, rectangular bar.

22. The external rotor, composite stepper motor for directly driving a vehicle wheel as recited in claim 21, wherein said raised, rectangular bar comprises at least one of: a laminated structure and a solid structure.

23. The external rotor, composite stepper motor for directly driving a vehicle wheel as recited in claim 20, wherein said at least one sensor comprises a coil disposed on a magnetic core structure disposed adjacent to said rotor and adapted for interaction with said plurality of sensor actuators.

24. The external rotor, composite stepper motor for directly driving a vehicle wheel as recited in claim 23, wherein said magnetic core structure comprises a laminated E-core comprising silicon steel.

25. The external rotor, composite stepper motor for directly driving a vehicle wheel as recited in claim 23, wherein said coil is provided with a high-frequency AC bias.

26. An electrically powered land vehicle, comprising:
   a) at least one wheel equipped with a direct-drive, external rotor stepper motor, said stepper motor comprising:
      i) a stator comprising a plurality of independent, coplanar stepper motors each comprising a group of adjacent pole pieces extending radially from a center of said stator and displaced from one another by a first angular displacement, each of said pole pieces comprising a predetermined number of stator teeth disposed at an outer periphery thereof, each of said independent stepper motors being separated from one another by a second angular displacement, said second angular displacement being larger than said first angular displacement;
      ii) a coil wound on each of said pole pieces, each of said coils being wound in an identical direction;
      iii) a substantially cylindrical external rotor disposed concentrically with and adjacent to said stators and having a first face, a second face opposed to said first face, a first radius to an inside surface thereof and a second radius to an outer surface thereof, said rotor comprising a predetermined number of teeth disposed on said inside surface and adapted for interaction with said stator teeth; and
      iv) a plurality of sensors disposed in a concentric ring on at least one of said first face and said second face of said rotor at a radius greater than said first radius and smaller than said second radius;
   b) a controller operatively connected to said stator and said sensors of said stepper motor and adapted to selectively energize said coils thereof.

27. The electrically powered land vehicle as recited in claim 26, wherein said controller is adapted for providing energy to said coils in a predetermined sequence and at a time dependent upon at least one of: the rotational speed of said rotor and a signal sensor from at least one of said sensors.

28. The electrically powered land vehicle as recited in claim 27, wherein said controller energizes at least one of said coils of each of said stepper motors substantially simultaneously.

29. The electrically powered land vehicle as recited in claim 26, wherein said at least one direct drive, external rotor stepper motor generates energy while said rotor is turning and said stators are not energized and said controller is adapted to recover said energy.

30. The electrically powered land vehicle as recited in claim 26, further comprising:
   c) a detent disposed in said rotor; and
   d) a plunger disposed proximate said stator and adapted for engagement with said detent when said rotor is in a stopped state, said plunger being moveable between an engaged position and a retracted position.

31. The electrically powered land vehicle as recited in claim 28, wherein said controller is adapted to receive and process a signal from at least one of the sources: means for determining the direction of said vehicle, means for controlling the velocity of said vehicle, means for braking said vehicle, means for steering said vehicle.

32. The electrically powered land vehicle as recited in claim 31, wherein said controller is adapted to energize different ones of said at least one direct-drive, external rotor stepper motors associated with said at least one wheel differently dependent upon said signal from said means for steering.

33. The electrically powered land vehicle as recited in claim 27, wherein said plurality of independent, coplanar stepper motors comprises four independent, coplanar stepper motors and said groups of adjacent pole pieces comprise three adjacent pole pieces and said predetermined number of teeth on said rotor is approximately 99.

* * * * *